(12) United States Patent
Park

(10) Patent No.: US 9,253,642 B2
(45) Date of Patent: Feb. 2, 2016

(54) SYSTEM AND METHOD FOR ONLINE ACTIVATION OF WIRELESS INTERNET SERVICE

(75) Inventor: Jong-Han Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 31 days.

(21) Appl. No.: 13/989,852

(22) PCT Filed: Nov. 29, 2011

(86) PCT No.: PCT/KR2011/009174
§ 371 (c)(1),
(2), (4) Date: May 28, 2013

(87) PCT Pub. No.: WO2012/074279
PCT Pub. Date: Jun. 7, 2012

(65) Prior Publication Data
US 2013/0247219 A1 Sep. 19, 2013

(30) Foreign Application Priority Data

Nov. 29, 2010 (KR) .......................... 10-2010-0119859

(51) Int. Cl.
*H04L 29/06* (2006.01)
*H04W 12/08* (2009.01)
*H04W 8/26* (2009.01)
*H04W 12/06* (2009.01)
*H04W 84/12* (2009.01)

(52) U.S. Cl.
CPC ........... *H04W 12/08* (2013.01); *H04L 63/0876* (2013.01); *H04L 63/0892* (2013.01); *H04L 63/101* (2013.01); *H04W 8/265* (2013.01); *H04W 12/06* (2013.01); *H04W 84/12* (2013.01)

(58) Field of Classification Search
CPC .............. H04L 63/101; H04L 63/0892; H04L 63/0876; H04W 12/08; H04W 8/265; H04W 12/06; H04W 84/12
USPC .......................................................... 726/27
See application file for complete search history.

(56) References Cited

U.S. PATENT DOCUMENTS 8,503,981 B1 * 8/2013 Xue et al. ........................ 455/411
2005/0021786 A1 * 1/2005 Kikkawa et al. ............... 709/229

(Continued)

FOREIGN PATENT DOCUMENTS

| JP | 2008-060647 A | 3/2008 |
|---|---|---|
| KR | 10-2005-0029800 A | 3/2005 |
| KR | 10-0609123 B1 | 8/2006 |

(Continued)

*Primary Examiner* — Chau Le
*Assistant Examiner* — Don Zhao
(74) *Attorney, Agent, or Firm* — IP Legal Services, LLC

(57) ABSTRACT

The present invention is related to method and system for online activation of a wireless internet service, which are capable of automatically transferring a MAC address required for an online activation of wireless internet services to an online activation server, thereby eliminating the subscriber burden of having to know the MAC address and preventing incorrect input of the MAC address.

10 Claims, 4 Drawing Sheets

(56) References Cited

U.S. PATENT DOCUMENTS

| | | | |
|---|---|---|---|
| 2005/0038876 A1* | 2/2005 | Chaudhuri | 709/219 |
| 2006/0253852 A1* | 11/2006 | Honda et al. | 717/177 |
| 2007/0094741 A1* | 4/2007 | Lynn et al. | 726/26 |
| 2007/0113269 A1* | 5/2007 | Zhang | 726/4 |
| 2009/0172798 A1* | 7/2009 | Upp | 726/10 |
| 2010/0166004 A1* | 7/2010 | Wang et al. | 370/401 |
| 2010/0188975 A1* | 7/2010 | Raleigh | 370/230.1 |
| 2013/0007848 A1* | 1/2013 | Chaskar et al. | 726/4 |

FOREIGN PATENT DOCUMENTS

| | | |
|---|---|---|
| KR | 10-2009-0046055 A | 5/2009 |
| KR | 10-2010-0076436 A | 7/2010 |
| WO | 2005/013582 A2 | 2/2005 |

\* cited by examiner

FIG. 4

| Access Control Type | IP | Port | Protocol | URL | Notes |
|---|---|---|---|---|---|
| Access-Accept | 168.126.63.1 | any | any | - | DNS address |
| Access-Accept | 147.6.123.90 | any | any | - | IP of online activation server |
| ...... | ...... | ...... | ...... | - | ...... |
| Redirection | - | 80 | - | http://online-wibro-server.com | Build a redirect web URL |

SYSTEM AND METHOD FOR ONLINE ACTIVATION OF WIRELESS INTERNET SERVICE

TECHNICAL FIELD

The present invention relates to method and system for online activation of a wireless internet service. Particularly, the present invention relates to automatically transferring a MAC address of user equipment to an online activation server when restrictedly allowing a non-activated user equipment to access the online activation server in a wireless internet service, thereby enabling a user to accurately and easily realize the online activation without inputting the MAC address of the user equipment during the online activation process.

Hereinafter, in at least one embodiment of the present invention, portable internet services will be described as an example of wireless internet services. The present invention, however, is not limited thereto.

BACKGROUND ART

Typically, portable internet access methods may include the following two mechanisms: i) an Extensible Authentication Protocol-Authentication and Key Agreement (EAP-AKA) authentication mechanism using universal IC card (UICC); and ii) an Extensible Authentication Protocol-Transaction Level Security (EAP-TLS) authentication mechanism. The EAP-TLS authentication mechanism performs authentication using a certificate and a media access control (MAC) address stored in user equipment.

In the case of the EAP-AKA authentication mechanism using UICC, a service provider has information required for authentication in advance since the service provider needs to provide a user (a customer) with the UICC when the user subscribes to a portable internet service. In the case of the EAP-TLS authentication mechanism, many users may not necessarily purchase user equipment embedded with portable internet functions from service providers. Accordingly, when subscribing to a portable internet service using such user equipment, a user needs to provide a MAC address of the user equipment to a service provider.

Meanwhile, in the case of activating a portable internet service using user equipment supporting the EAP-TLS authentication mechanism, such activation processes may be classified into an online activation and an off-line activation. Hereinafter, an activation of the portable internet service may be referred to as an activation of user equipment for the portable internet service, an activation of user subscription for the portable internet service, or a proper portable internet service subscription.

Herein, where user equipment to be activated does not perform a portable internet service access, the off-line activation is realized by accessing an online subscription web page through other internet access schemes or by visiting a subscription agency.

In addition, the online activation is an activation scheme that accesses portable internet services directly using user equipment to be activated and then performs a service activation at an online subscription web page. In order to support the online activation scheme, when a non-activated user equipment tries to perform authentication, an authentication, authorization, and accounting (AAA) server may enforce a restricted access-accept rule to permit only access to the online subscription web page (an online activation web page) without instantly performing an authentication failure process. Herein, the restricted access-accept rule enables an address of the online subscription web page to be sent to an access control system from the AAA server. Accordingly, when user equipment to be activated requests a web access in order to use the internet, the user equipment may access the online subscription web page (the online activation web page) by being redirected to an address of the online subscription web page, which the AAA server sent to the access control system, according to the restricted access-accept rule. Accordingly, an online activation procedure may be induced by such redirection process.

In this case, a user is generally required to input a MAC address of corresponding user equipment in order to activate the user equipment. If the user inputs a wrong MAC address, a service activation may be performed for the wrong MAC address. Furthermore, there is an inconvenience that the user should know the MAC address of the user equipment. For this reason, inputting the MAC address may be a burden on users.

DISCLOSURE OF INVENTION

Technical Problem

The related art as described above has a problem that inconvenience may be caused to users and MAC addresses may be wrongly inputted because the users themselves need to know the MAC addresses of user equipment and to manually input the MAC addresses. An object of the present invention is to overcome such problems.

Accordingly, an object of the present invention is to provide method and system for online activation of a wireless internet service, capable of automatically transferring a MAC address required for an online activation of wireless internet services to an online activation server, thereby eliminating the subscriber burden of having to know the MAC address and preventing incorrect input of the MAC address.

The object of the present invention is not limited to the aforesaid, but might be extended to other cases. Other objects and advantages of the present invention not described herein will be understood by the following description, and become more apparent from the embodiments of the present invention. Also, it can be easily understood that the objects and advantages of the present invention can be realized by the units and combinations thereof recited in the claims.

Technical Solution

In accordance with an embodiment of the present invention, a system for performing an online activation of a wireless Internet service includes: an AAA server configured to perform authentication and authorization using a MAC address of user equipment, to transfer an access control rule including the MAC address of the user equipment to an access control system when the user equipment is in a non-activated state, and to complete activation by registering the user equipment using activation information delivered from an online activation server; the access control system configured to connect the user equipment to the online activation server by redirection of an access request of the user equipment to the online activation server according to the access control rule received from the AAA server, wherein the redirected access request includes the MAC address of the user equipment; and the online activation server configured to obtain the MAC address of the user equipment when the user equipment is connected through redirection, to perform activation using the obtained MAC address, and to deliver activation information including the MAC address of the user equipment to the AAA server.

In accordance with another embodiment of the present invention, a method of performing an online activation of a wireless Internet service includes: establishing an access control rule including a MAC address of user equipment when the user equipment is in a non-activated state based on authentication and authorization results; redirecting an access request of the user equipment to an online activation server according to the established access control rule, wherein the redirected access request includes the MAC address of the user equipment; and obtaining the MAC address of the user equipment when the user equipment is connected to the online activation server through the redirecting, and performing the online activation using the obtained MAC address.

Advantageous Effects

As set forth above, at least one embodiment of the present invention may transfer a MAC address, which is sent to AAA server for a network access in an online activation process of wireless internet services, to an online activation server through a redirection, and thereby allowing for manual input of the MAC address and realizing an accurate and convenient activation for the case of an online activation.

That is, at least one embodiment of the present invention may enable a user to accurately and easily realize the online activation, without inputting a MAC address of the user equipment during the online activation process, by automatically transferring the MAC address of user equipment to an online activation server when restrictedly allowing a non-activated user equipment to access the online activation server in a wireless internet service.

BRIEF DESCRIPTION OF THE DRAWINGS

FIG. 4 is an exemplary diagram illustrating an access control rule table established in an access control system in accordance with at least one embodiment of the present invention.

MODE FOR CARRYING OUT THE INVENTION

The foregoing objects, features and advantages will become more apparent from the following detailed description of at least one embodiment of the present invention with reference to accompanying drawings, which are set forth hereinafter. Accordingly, those having ordinary knowledge in the related art to which the present invention pertains will easily embody technical ideas in the spirit of the present invention. Further, when technical configurations known in the related art are considered to make the contents obscure in the present invention, the detailed description thereof will be omitted. Hereinafter, exemplary embodiments of the present invention will be described in detail with reference to the accompanying drawings.

In this disclosure below, when one part is referred to as being 'connected' to another part, it should be understood that the former can be 'directly connected' to the latter, or 'electrically connected' to the latter via an intervening part. Furthermore, when it is described that one part "comprises" or "includes" some elements, it should be understood that it may comprise (or include) only those elements, or it may comprise (or include) other elements as well as those elements if there is no specific limitation.

Figure 1:
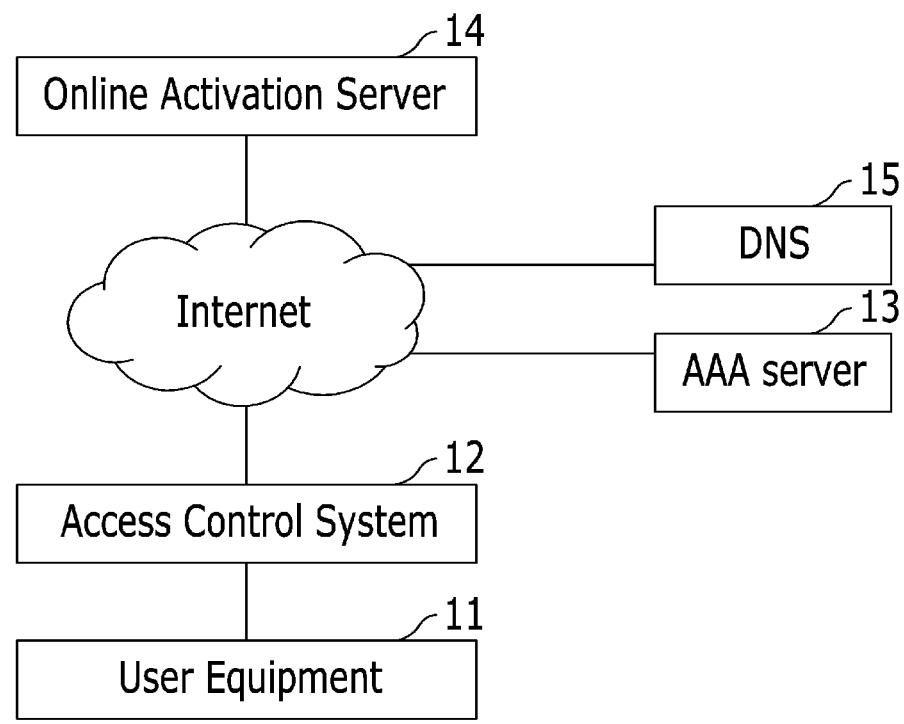
FIG. 1 is a diagram illustrating a system for online activation of a portable internet service in accordance with at least one embodiment of the present invention.

FIG. 1 is a diagram illustrating a system for online activation of a portable internet service in accordance with at least one embodiment of the present invention.

As shown in FIG. 1, the system for online activation of a portable internet service in accordance with at least one embodiment of the present invention may include user equipment 11, access control system 12, AAA (authentication, authorization, and accounting) server 13, online activation server 14, and domain name server (DNS) 15.

Herein, AAA server 13 may perform authentication and authorization using a MAC address of user equipment 11, and transfer an access control rule including the MAC address of user equipment 11 to access control system 12 when user equipment 11 is determined to be in a non-activated state based on the authentication and authorization results. Furthermore, AAA server 13 may complete an activation process by registering user equipment 11 using activation information delivered from online activation server 14. Access control system 12 may connect user equipment 11 to online activation server 14 by redirecting an access request of user equipment 11 to online activation server 14 according to the access control rule received from AAA server 13. Herein, the redirected access request may include the MAC address of user equipment 11. In at least one embodiment of the present invention, access control system 12 may be referred to as access service network (ASN). Online activation server 14 may obtain the MAC address of user equipment 11 when user equipment 11 accesses online activation server 14 through redirection. Furthermore, online activation server 14 may perform an activation of user equipment 11 (i.e., an activation of a portable internet service) using the obtained MAC address, and deliver the activation information including the MAC address of user equipment 11 to AAA server 13. In at least one embodiment of the present invention, online activation server 14 may be embodied in or referred to as a subscription portal.

Such operations of the online activation system for a portable internet service according to at least one embodiment of the present invention will be briefly described as follows.

AAA server 13 may perform authentication and authorization using an MAC address of user equipment 11.

When user equipment 11 is determined to be in a non-activated state based on the authentication and authorization results, AAA server 13 may transfer an access control rule including the MAC address of user equipment 11 to access control system 12.

In the case that the access control rule is transferred to access control system 12, access control system 12 may connect user equipment 11 to online activation server 14 by redirecting an access request of user equipment 11 to online activation server 14 according to the access control rule received from AAA server 13. In this case, access control system 12 may transfer the redirected access request including the MAC address of user equipment 11, to online activation server 14.

Thereafter, online activation server 14 may obtain the MAC address of user equipment 11, and perform an activation process using the obtained MAC address. After performing the activation process, online activation server 14 may deliver activation information including the MAC address of user equipment 11, to AAA server 13.

When receiving the activation information from online activation server 14, AAA server 13 may complete the activation process by registering user equipment 11 using the received activation information.

Such activation operation will be described in more detail with reference to FIG. 2 and FIG. 3.

Figure 2:
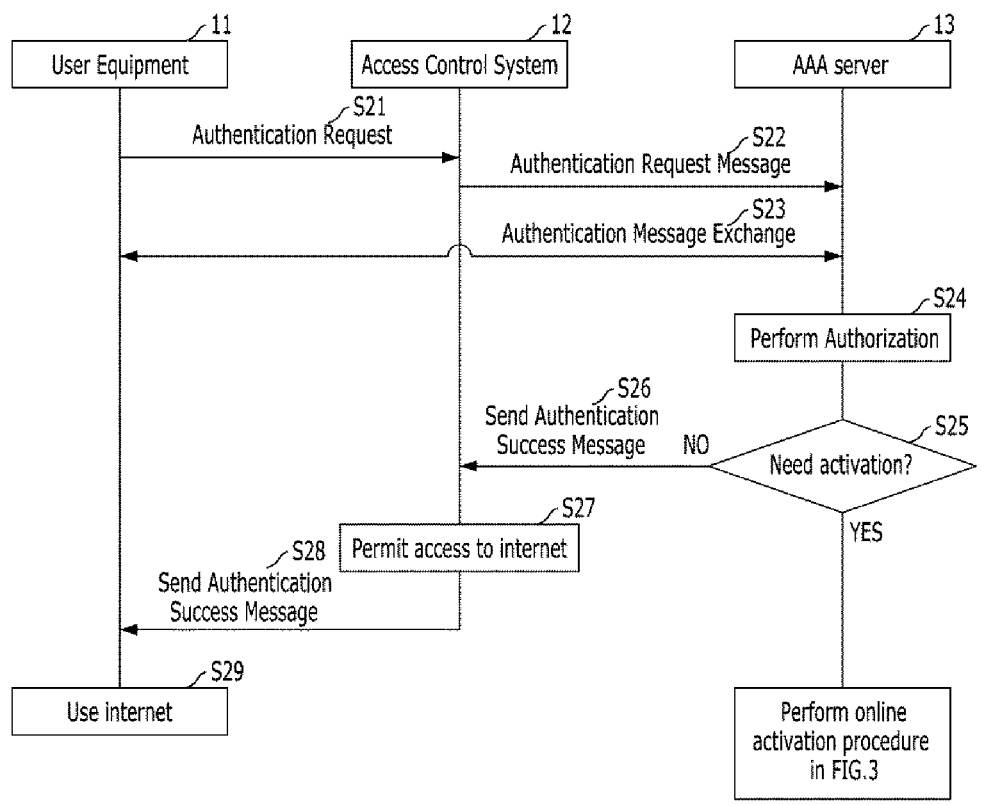
FIG. 2 is a flowchart illustrating an authentication process for a properly activated user equipment in a portable internet service in accordance with at least one embodiment of the present invention.

FIG. 2 is a flowchart illustrating an authentication process for a properly activated user equipment in a portable internet service in accordance with at least one embodiment of the present invention.

At step S21, user equipment 11 (e.g., a portable internet terminal) may send an authentication request (including a MAC address) to access control system 12.

At step S22, when receiving the authentication request from user equipment 11, access control system 12 may forward an authentication request message to AAA server 13 by using AAA protocols, such as Diameter or RADIUS. Herein, the authentication request message may include the MAC address of user equipment 11.

Thereafter, at step S23, authentication may be performed by exchanging authentication messages a plurality of times between user equipment 11 and AAA server 13 through access control system 12 (i.e., user equipment 11↔access control system 12↔AAA server 13) until the authentication is complete. Herein, the AAA protocols exchanging messages may be Diameter or RADIUS protocols. Inner authentication mechanism may use EAP protocol such as EAP-TLS.

At step S24, after completing authentication as described above, AAA server 13 may perform authorization identifying whether an activation of user equipment 11 corresponding to a specific MAC address is complete.

At step S25, AAA server 13 may determine whether the activation of user equipment 11 is required, based on the authorization results. At step S26, when it is determined that user equipment 11 is properly activated, based on the authorization results, AAA server 13 may send an authentication success message to access control system 12. At step S27, when receiving the authentication success message from AAA server 13, access control system 12 may permit user equipment 11 to access the internet. Furthermore, at step S28, access control system 12 may forward the authentication success message to user equipment 11. Accordingly, when receiving the authentication success message, user equipment 11 may use the internet at step S29.

Meanwhile, at step 25, when it is determined that the activation of user equipment 11 is required, based on the authorization results, an online activation procedure may be performed. Herein, the online activation procedure will be described with reference to FIG. 3

Figure 3:
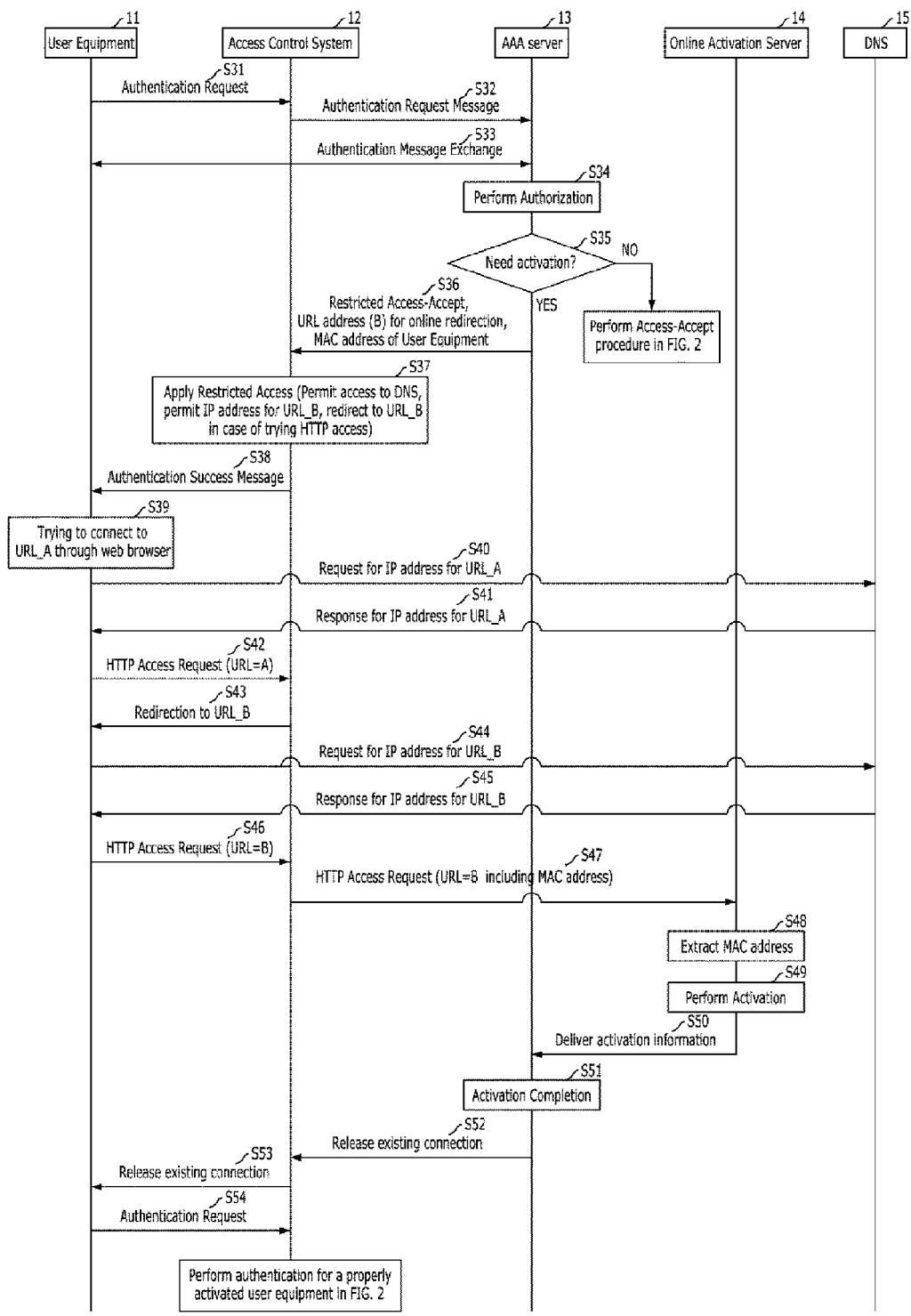
FIG. 3 is a flowchart illustrating a method for online activation of a portable internet service in accordance with at least one embodiment of the present invention.

FIG. 3 is a flowchart illustrating a method for online activation of a portable internet service in accordance with at least one embodiment of the present invention. That is, FIG. 3 illustrates an access authentication procedure and an online activation procedure for a portable internet service of non-activated user equipment.

At step S31, non-activated user equipment 11 (e.g., a portable internet terminal having not yet been activated) may send an authentication request (including a MAC address) to access control system 12.

At step S32, when receiving the authentication request from user equipment 11, access control system 12 may forward an authentication request message to AAA server 13 by using AAA protocols, such as Diameter or RADIUS. Herein, the authentication request message may include the MAC address of user equipment 11.

Thereafter, at step S33, authentication may be performed by exchanging authentication messages a plurality of times between user equipment 11 and AAA server 13 through access control system 12 (i.e., user equipment 11↔access control system 12↔AAA server 13) until the authentication is complete. Herein, the AAA protocols exchanging messages may be Diameter or RADIUS protocols. Inner authentication scheme may use EAP protocol such as EAP-TLS.

At step S34, after completing authentication as described above, AAA server 13 may perform authorization identifying whether an activation of user equipment 11 corresponding to a specific MAC address is complete.

When it is determined that user equipment 11 is properly activated and an activation of user equipment 11 is not required, based on the authorization results, an access to the Internet may be permitted at step S26 to step S29 as shown in FIG. 2.

Meanwhile, at step S35, AAA server 13 may determine whether the activation of user equipment 11 is required, based on the authorization results. At step S36, when it is determined that user equipment 11 is non-activated, based on the authorization results, AAA server 13 may send authentication results to access control system 12. Herein, the authentication results may represent a restricted access-accept (a restricted access acceptance) and include URL address (URL_B) for online redirection and a MAC address of corresponding user equipment. That is, the URL address (URL_B) for online redirection, which is sent to access control system 12 by AAA server 13, may include the MAC address of user equipment 11 transferred through the authentication request message at step S32. Accordingly, a URL address of online activation sever 14 may be differently created according to user equipments.

At step S37, access control system 12 may enforce an access-accept rule (an access control rule) which restrictedly permits user equipment 11 to access only DNS 15 and online activation server 14 (URL=B). Furthermore, at step S37, access control system 12 may set a redirection rule (an access control rule). Herein, in the case of a hypertext transfer protocol (HTTP) access request for access to a certain website other than online activation server 14, the redirection rule may redirect the HTTP access request to online activation server 14 (URL=B).

At step S38, access control system 12 may complete an authentication procedure according to an authentication protocol, by sending an authentication success message to user equipment 11.

When trying to access a certain web site (URL=A) using HTTP protocol of a web browser at step S39, user equipment 11 may typically obtain IP address of URL_A through DNS 15 at step S40 and step S41. That is, when user equipment 11 requests the IP address corresponding to URL_A to DNS 15 at step S40, DNS 15 may deliver the IP address of URL_A to user equipment 11 in response to the request at step S41.

Thereafter, at step S43, when user equipment 11 tries to access URL_A location using the IP address corresponding to URL_A at step S42, access control system 12 may force user equipment 11 to perform a redirection to URL_B corresponding to the address of online activation server 14 according to the access control rule (i.e., the redirection rule sent to access control system 12 by AAA server 13) set at step S37.

At step S44 and step S45, user equipment 11 may obtain IP address corresponding to URL_B from DNS 15. That is, when user equipment 11 request the IP address of URL_B to DNS 15 at step S44, DNS 15 may deliver the IP address of URL_B to user equipment 11 in response to the request at step S45.

Thereafter, when user equipment 11 tries HTTP access using the IP address corresponding to URL_B at step S46, access control system 12 may enable user equipment 11 to access online activation server 14 using HTTP protocol, by permitting access to the corresponding IP address according to the access control rule (i.e., access-accept rule) set in an operation of step S37, at step S47. Herein, in case of HTTP access attempt to online activation server 14, URL_B being sent to online activation server 14 may include the MAC address of user equipment 11 which AAA server 13 sent to access control system 12 at step S36.

At step S48, online activation server 14 may extract the MAC address of user equipment 11 included URL_B.

At step S49, online activation server 14 may receive input information, such as payment information, required for activation from a user, and perform an activation procedure using the input information. Furthermore, at step S50, online activation server 14 may deliver activation information including the corresponding MAC address to AAA server 13.

At step S51, AAA server 13 may register user equipment 11 as a properly activated user equipment by storing the activation information in subscriber information database (DB).

At step S52, after registration of the properly activated user equipment 11 is complete, AAA server 13 may send an access release message to access control system 12 in order to release an existing connection to which a restricted control—accept rule is applied. At step S53, when receiving the access release message from AAA server 13, access control system 12 may release the existing connection with user equipment 11.

Thereafter, when user equipment 11 sends an authentication request at S54 to access control system 12, a user may use the Internet through an access procedure of a properly activated user equipment as shown in FIG. 2 (especially, S22 to S29).

FIG. 4 is an exemplary diagram illustrating an access control rule table established in an access control system in accordance with at least one embodiment of the present invention.

As shown in FIG. 4, the access control rule table may include an access-accept rule, a redirection rule, and so forth.

Herein, the access-accept rule may enable user equipment 11 to perform an access procedure using an IP address, a port number, and/or a protocol which are set in the access control rule table.

The redirection rule may enable a HTTP access request to be redirected to a specific URL included in the redirection rule.

In at least one embodiment of the present invention, the redirection rule may be created for each user equipment, and include an inherent MAC address of each user equipment. That is, the redirection rule may be created by combination of a URL stored in AAA server 13 and a MAC address of user equipment 11. The created redirection rule may be included in the access control rule which is transferred from AAA server 13 to access control system 12.

Meanwhile, the online activation method for a wireless internet service in accordance with at least one embodiment of the present invention as described above may be implemented as a program command type that can be executed through various computer means and may be recorded in a computer readable medium. The computer readable medium may include program commands, data fields, a data structure, and the like, alone or a combination thereof. The program commands recorded in the medium is specially designed and configured for the present invention or may be used by being known to those skilled in the art of computer software. An example of the computer readable recording medium may include magnetic media such as hard disk, floppy disk, magnetic tape, and the like, optical media such as CD-ROM, DVD, and the like, magneto-optical media such as floptical or optical disk, and hardware devices specially configured to store and perform program commands such as ROM, RAM, flash memory, and the like. The medium may be a transmission medium such as light, a metal line, a waveguide, and the like, including a carrier transmitting a signal designating a program command, data architecture, and the like. An example of the program commands may include a machine language code made by a compiler and a high-level language code executable by a computer using an interpreter, and the like. The above-mentioned hardware devices may be configured to be operated as at least one software module so as to perform an operation of the present invention, and vice versa.

As described above, although the present invention is described by the limited embodiments and drawings, the present invention is not limited to the above-described. Various forms of substitutions, modifications and alterations may be made by those skilled in the art from the above description without departing from the spirit of the prevent invention.

Accordingly, the scope of the present invention is not construed as being limited to the described embodiments but is defined by the appended claims as well as equivalents thereto.

INDUSTRIAL APPLICABILITY

A method and a system for online activation of a wireless internet service in accordance with at least one embodiment of the present invention may automatically transfer a MAC address required for activation of a non-activated user equipment to an online activation server without manual input of a subscriber during online activation process of the user equipment in a wireless internet access service. Accordingly, the method and system may be used to accurately and easily realize the online activation process.

The invention claimed is:

1. A system for performing an online activation of a wireless Internet service, the system comprising:
an authentication, authorization, and accounting (AAA) server configured to perform authentication and authorization using a media access control (MAC) address of user equipment, (ii) to determine whether an activation of the user equipment is required, based on authentication and authorization results, (iii) to automatically transfer an access control rule associated with the activation of the user equipment, to an access control system when the activation of the user equipment is determined to be required, wherein the access control rule includes the MAC address of the user equipment and address information of an online activation server, and (iv) to complete activation by registering the user equipment using activation information delivered from the online activation server;
the access control system configured (i) to automatically receive the access control rule from the AAA server, (ii) to receive an access request for accessing a website other than the online activation server, from the user equipment being in a non-activated state, and (iii) to connect the user equipment to the online activation server by redirecting the access request of the user equipment to the online activation server, according to the access control rule received from the AAA server, wherein the redirected access request includes the MAC address of the user equipment such that the MAC address is used for the activation of the user equipment in the online activation server; and the online activation server configured (i) to automatically receive the redirected access request from the access control system, (ii) to obtain the MAC address from the redirected access request, (iii) to perform an activation procedure for the user equipment using the MAC address, and (iv) to deliver activation information including the MAC address to the AAA server.

2. The system of claim 1, wherein the access control system is configured to enforce an access-accept rule to restrictedly permit access to a domain name server (DNS) and the online activation server, and to set a redirection rule to redirect a hypertext transfer protocol (HTTP) access attempt for the website other than the online activation server, to the online activation server.

3. A method of performing an online activation of a wireless Internet service, the method comprising:
receiving, by an authentication, authorization, and accounting (AAA) server, an authentication request of user equipment, from an access control system;
performing, by the AAA server, authentication and authorization procedures for the user equipment when the authentication request is received;
determining, by the AAA server, whether an activation of the user equipment is required, based on authentication and authorization results;
automatically transferring, by the AAA server, an access control rule associated with the activation of the user equipment, to the access control system when the activation of the user equipment is determined to be required, wherein the access control rule includes the MAC address of the user equipment and address information of an online activation server;
receiving, by the access control system, an access request for accessing a website other than the online activation server, from the user equipment being in a non-activated state;
redirecting, by the access control system, the access request of the user equipment to the online activation server according to the access control rule automatically received from the AAA server, wherein the redirected access request includes the MAC address of the user equipment such that the MAC address is used for the activation of the user equipment in the online activation server;
automatically receiving, by the online activation server, the redirected access request from the access control system;
obtaining, by the online activation server, the MAC address from the redirected access request automatically received from the access control system;
performing, by the online activation server, the online activation using the MAC address; and
transmitting, by the online activation server, activation information including the MAC address to the AAA server.

4. The method of claim 3,
wherein the redirecting further includes:
receiving, by the access control system, the access control rule from the AAA server; and
enforcing, by the access control system, the received access control rule.

5. The method of claim 4, wherein the redirecting includes:
connecting, by the access control system, the user equipment to the online activation server by redirecting the access request of the user equipment to the online activation server according to the received access control rule, wherein the redirected access request includes the MAC address.

6. The method of claim 3, further comprising:
receiving, by the AAA server, the activation information from the online activation server; and
registering, by the AAA server, the user equipment using the received activation information such that the online activation of the user equipment is completed.

7. A method of performing an online activation of a wireless Internet service, the method comprising:
receiving an authentication request message transferred according to an authentication request of user equipment, and performing authentication of the user equipment by exchanging authentication messages with the user equipment, wherein the authentication request message includes the MAC address of the user equipment;
performing authorization of the user equipment when the authentication of the user equipment is complete;
determining, by an authentication, authorization, and accounting (AAA) server, whether an activation of the user equipment is required, based on a result of the authorization;
automatically transmitting, by the AAA server, an access-accept rule including a uniform resource locator (URL) for a redirection and a media access control (MAC) address of the user equipment, to an access control system when the activation of the user equipment is determined to be required, wherein the access control system is configured (i) to receive an access request for accessing a website other than an online activation server, from the user equipment being in a non-activated state, and (ii) to redirect the received access request to the online activation server corresponding to the URL for the redirection, according to the access-accept rule, wherein the redirected access request includes the MAC address of the user equipment being in the non-activated state such that the MAC address is used for the activation of the user equipment in the online activation server; and
receiving activation information of the user equipment from the online activation server when the activation of the user equipment is automatically performed by the online activation server, and registering the user equipment as an activated user equipment, according to the access-accept rule for the user equipment,
wherein the online activation server is configured (i) to automatically receive the redirected access request including the MAC address, from the access control system, (ii) to automatically obtain the MAC address from the redirected access request automatically received from the access control system, (iii) to perform an activation procedure for the user equipment using the obtained MAC address, and (iv) to transmit the activation information to the AAA server after the activation procedure is performed.

8. The method of claim 7, further comprising:
when an authentication success message is received according to the access-accept rule, trying to connect to a certain URL through a web browser and obtaining an IP address corresponding to the certain URL from a DNS;
initiating the redirection to the URL of the online activation server by transmitting a first HTTP access request using the IP address corresponding to the certain URL, and obtaining an IP address corresponding to the URL of the online activation server from the DNS; and transmitting a second HTTP access request based on the IP address corresponding to the URL of the online activation server.

9. The method of claim 8, wherein:

when the user equipment is coupled to the online activation server according to the second HTTP access request based on the IP address corresponding to the URL of the online activation server, the online activation server is configured to extract the MAC address from the URL of the online activation server.

10. The method of claim 8, further comprising:

transmitting the authentication request message to the AAA server when the authentication request is received from the user equipment;

determining a restricted access to the DNS and the online activation server and the redirection for a certain HTTP access request when the access-accept rule is received from the AAA server, and transmitting the authentication success message;

performing the redirection to the URL of the online activation server when the first HTTP access request based on the IP address corresponding to the certain URL is received; and performing an HTTP access to the online activation server according to the access-accept rule when the second HTTP access request based on the IP address corresponding to the URL of the online activation server is received.

* * * * *

UNITED STATES PATENT AND TRADEMARK OFFICE
CERTIFICATE OF CORRECTION

PATENT NO. : 9,253,642 B2
APPLICATION NO. : 13/989852
DATED : February 2, 2016
INVENTOR(S) : Jong-Han Park Page 1 of 1

It is certified that error appears in the above-identified patent and that said Letters Patent is hereby corrected as shown below:

In the Specification:

Column 1, CROSS REFERENCE TO RELATED APPLICATIONS should be added under the title of the invention as follows.

--CROSS REFERENCE TO RELATED APPLICATIONS
This application is a National Stage Patent Application of PCT International Patent Application No. PCT/KR2011/009174 (filed on November 29, 2011) under 35 U.S.C. §371, which claims priority to Korean Patent Application No. 10-2010-0119859 (filed on November 29, 2010), the teachings of which are incorporated herein in their entireties by reference.--.

In the Claims:

In claim 1, column 8, line 41, "to perform" should be amended to --(i) to perform--.

Signed and Sealed this
Ninth Day of August, 2016

Michelle K. Lee
*Director of the United States Patent and Trademark Office*